United States Patent [19]

Jeffery et al.

[11] Patent Number: 4,507,050
[45] Date of Patent: Mar. 26, 1985

[54] PNEUMATIC VALVE CONTROL FOR CIRCULATION CONTROL AIRCRAFT

[75] Inventors: Philip A. E. Jeffery, Trumbull; Thomas H. Lawrence, Seymour, both of Conn.

[73] Assignee: United Technologies Corporation, Hartford, Conn.

[21] Appl. No.: 559,995

[22] Filed: Dec. 9, 1983

[51] Int. Cl.³ .................. B64C 11/24; F01D 5/18
[52] U.S. Cl. .................. 416/90 A; 244/17.11
[58] Field of Search ............ 416/90 A, 20 A, 90 R, 416/20 R; 244/17.11, 17.13

[56] References Cited

U.S. PATENT DOCUMENTS

| 2,925,129 | 2/1960 | Yuan et al. | 416/90 |
|-----------|--------|-------------|--------|
| 3,348,618 | 10/1967 | Flint et al. | 416/90 A |
| 3,918,833 | 11/1975 | Eilertson | 416/20 R |
| 3,990,811 | 11/1976 | Danielson | 416/90 A |
| 4,132,500 | 1/1979 | Reader et al. | 416/90 A |
| 4,242,044 | 12/1980 | McCoubrey | 416/90 A |

FOREIGN PATENT DOCUMENTS 1188391  4/1970  United Kingdom ............. 244/17.11

OTHER PUBLICATIONS

Reader, Kirkpatrick, Williams, "Status Report on Adv. Develop. Prog. Utilizing CCR Technology," Fourth Europ. Rotorcraft and Powered Lift Aircraft Forum, Stresa, Italy, Sep. 13–15, 1978.
Barnes, Kirkpatrick, McCoumbrey, "Circulation Control Rotor Flight Demonstrator," AHS Mideast Region Symposium on Rotor Technology, Aug. 1976.

Primary Examiner—Robert E. Garrett
Assistant Examiner—George Kapsalas
Attorney, Agent, or Firm—Russell M. Lipes, Jr.

[57] ABSTRACT

A circulation control rotor system in which butterfly valves (44, 46) control the flow of compressed air from a plenum chamber (40) to the rotor blades (14). Each has an actuator (48, 52) positioning the valve in accordance with a control input and in which a spring loaded averaging linkage (120) between adjacent valves around a plenum chamber circumference acts to position the valve at an average position of the two adjacent valves if a fault in the actuator or within its control or power system should develop. Should such a fault develop, as determined by a comparison of actual valve position with command position, the faulty valve's actuator is shut down.

10 Claims, 8 Drawing Figures

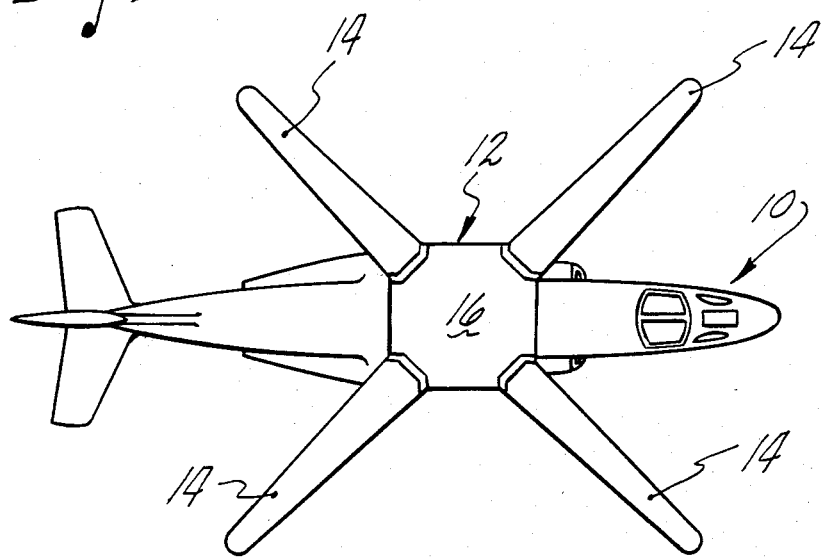
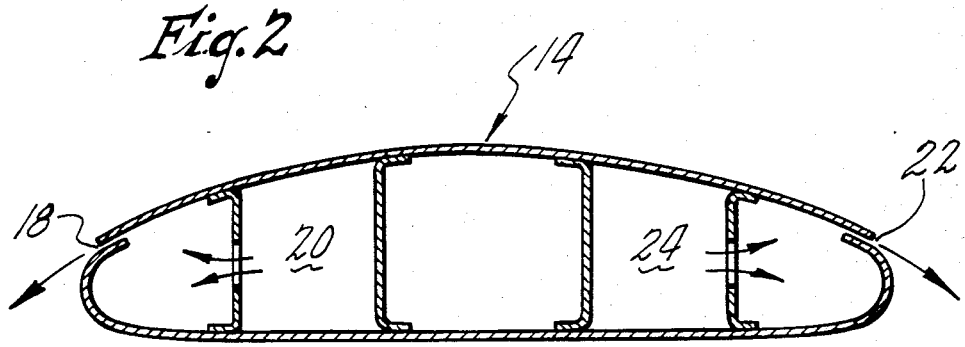

PNEUMATIC VALVE CONTROL FOR CIRCULATION CONTROL AIRCRAFT

The Government has rights in this invention pursuant to Contract No. MDA 903-81-C-0281 awarded by the Department of the Army.

DESCRIPTION

1. Technical Field

This invention relates to the valve control mechanism modulating airflow to the blades of a circulation control rotor system such as used on an X-wing type aircraft.

2. Background Art

An X-wing aircraft is a rotary wing aircraft that uses a rigid rotor/wing utilizing circulation control airfoils. The rotor is driven mechanically and the rotor blades operate essentially in fixed pitch. The rotor may rotate, as in a helicopter, or it may be stopped so as to act like a fixed wing. Collective and cyclic control is achieved by control of air circulation about the blade airfoils. This is done by blowing compressed air through leading edge and trailing edge ducts in the rotor blades and modulating the amount of air being ejected through the spanwise slots on the leading and trailing edge.

The rotor system for an X-wing aircraft includes a hub and attached rotor blades and a pneumatic system for delivering compressed air separately to the leading edge and the trailing edge of the individual rotor blades at a desired pressure and mass flow. The pneumatic system includes a compressor, a stationary air supply to the rotor, valving for controlling the flow of air to the leading edge and the trailing edge of the blades, and a rotating air distribution arrangement. It is the air control valving which is the subject of this invention. Pneumatic system structures for circulation control aircraft are shown in copending applications Ser. Nos. 431, 475, now abandoned, and 431,476 filed Sept. 30, 1982.

A circulation control rotor system is described in the report titled "Circulation Control Rotor Flight Demonstrator" by David R. Barnes, Douglas G. Kirkpatrick and George A. McCoubrey presented at an American Helicopter Society Mideast Region Symposium in August, 1976. The report titled "Status Report on Advanced Development Program Utilizing Circulation Control Rotor Technology" by Kenneth R. Reader, Douglas G. Kirkpatrick and Robert M. Williams, Paper No. 44 presented at the Fourth European Rotorcraft and Powered Lift Aircraft Forum, Stresa, Italy, Sept. 13-15, 1978 describes an X-wing development program.

Davidson et al U.S. Pat. No. 3,139,936 and Flint et al U.S. Pat. Nos. 3,348,618 and 3,349,853 describe a control mechanism for a helicopter having circulation control with compressed air being supplied through the rotor pillar. Cheeseman et al U.S. Pat. No. 3,524,711 and Seed U.S. Pat. No. 3,567,332 describe helicopter rotors employing circulation control.

DISCLOSURE OF INVENTION

An object of the present invention is to provide an improved pneumatic system for an aircraft having a circulation control rotor system.

Another object of the invention is to provide improved valve control mechanism for the pneumatic system of a circulation control aircraft.

Still another object of the invention is the provision of linkage and a fault monitoring system which senses, compensates and automatically removes from operation faulty individual air valves in the pneumatic system of a circulation control aircraft.

The foregoing and other objects and advantages of the present invention may be seen by referring to the following description and claims, read in conjunction with the accompanying drawings.

BRIEF DESCRIPTION OF THE DRAWINGS

FIG. 1 is a top view of a circulation control aircraft of the X-wing type.

FIG. 2 is an X-wing blade airfoil section illustrating typical circulation control.

BEST MODE FOR CARRYING OUT THE INVENTION

Figure 3:
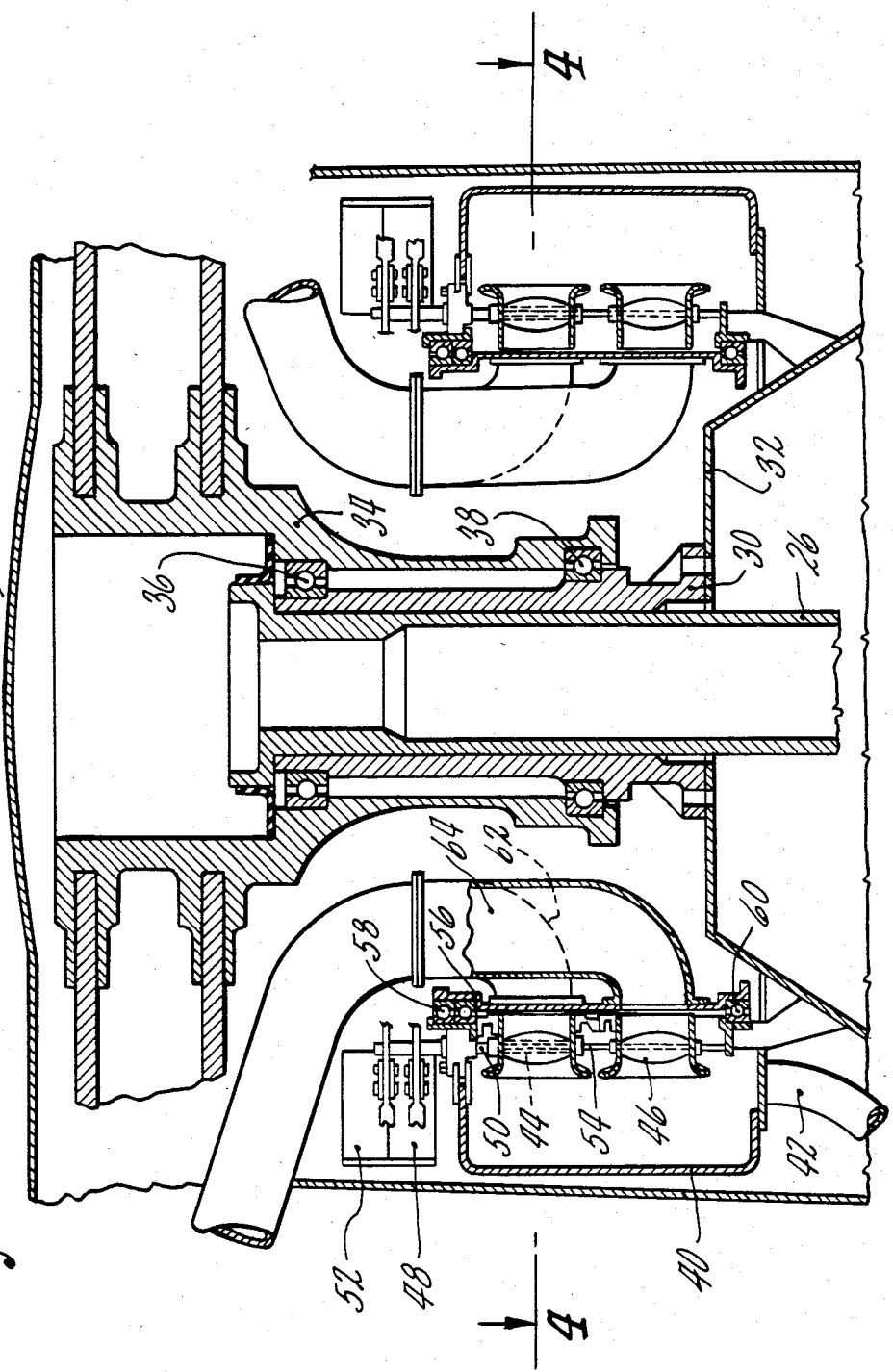
FIG. 3 shows the arrangement of airflow modulation butterfly valves and the airflow path from the plenum chamber to the blades.

The aircraft of FIG. 1 includes fuselage 10 on top of which is mounted rotor system 12 including four blades 14 and hub portion 16. Blades 14 are circulation control airfoils, and as shown in FIG. 2 each blade has leading edge slot 18 through which compressed air from duct 20 is ejected and trailing edge slot 22 through which compressed air from, duct 24 is ejected. The slot airflow is modulated as a function of blade azimuthal position to provide collective lift increment, mono-cyclic control, higher harmonic cyclic control and flow cut-off. Control is obtained by cyclically and collectively modulating the amount of ejected airflow. In certain flight regimes such as landing and taking off, the rotor system rotates, and in other flight regimes such as forward flight the rotor system is stationary and is secured in the position shown in FIG. 1.

Primary control of the circulation control rotor system is accomplished by a set of pneumatic control valve actuators controlling the position of butterfly type control valves around a circumference of a stationary annular plenum chamber surrounding the rotor drive shaft just below the rotor plane of rotation. The actuators are packaged in pairs, one actuator for leading edge control and another for trailing edge control, with the actuators being equally spaced around the annular plenum. The leading edge set of valves and the trailing edge set of valves are located directly below the actuators in separate annular arrangements to permit coaxial actuation.

In FIG. 3 there is shown the plenum chamber and butterfly valve arrangement. Rotor drive shaft 26 is connected to rotor head 28, the shaft being supported by fixed mast 30 which is attached to helicopter structure 32. Sleeve 34 is part of the rotor head and bearings 36 and 38 are located between the sleeve and the fixed mast. Plenum chamber 40 surrounds drive shaft 26 just below the rotor head and is fixed to helicopter structure 32. Compressed air is delivered to the plenum chamber through one or more ducts 42.

Two sets of butterfly valves 44 and 46 control the flow of air from the plenum chamber to the rotor blades, the flow of air being modulated through control of the position of each valve. The valves in each set are equally spaced around the inner perimeter of the plenum chamber, twenty-four valves being used in each set in this embodiment, and the upper set of valves is located directly above the lower set of valves. An actuator for each valve is mounted in pairs above the valves, actuator 48 being connected by shaft 50 to upper butterfly valve 44, and actuator 52 above actuator 48 being connected by shaft 54 to lower butterfly valve 46. Shaft 54 extends through shaft 50 and is coaxial therewith.

The inner periphery of the plenum chamber is a rotating wall which is connected to and rotates with the rotor head. As shown, circumferential wall 56 rotates with rotor head 28, bearings 58 and 60 being provided between the wall and the fixed portion of the plenum chamber. There are air collectors extending between wall 56 and each blade, each air collector including duct 62 for receiving air passing through butterfly valves 44 and delivering it to the leading edge slot of its blade and a duct 64 for receiving air passing through butterfly valves 46 and delivering it to the trailing edge slot of the blade. Each duct has an opening at wall 56 which spans the width of from one to two valve openings, and preferably about two apertures so that a short averaging effect is produced which smoothes valve-to-valve transitions and tends to reduce transient disturbances which might result from an inoperative or disabled pneumatic control system.

Figure 4:
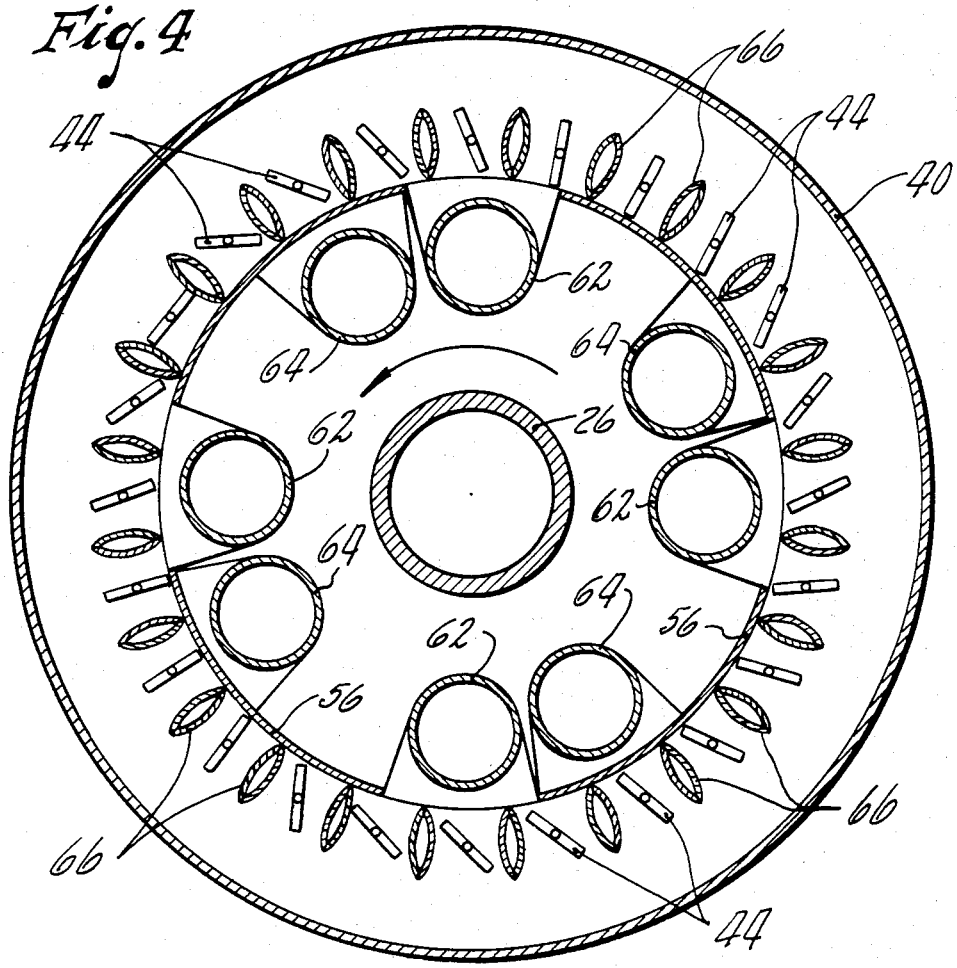
FIG. 4 is a schematic view looking downward along line 4—4 in FIG. 3.

FIG. 4 is a schematic view looking downward along line 4—4 in FIG. 3. Plenum chamber 40 is shown surrounding rotor drive shaft 26, and rotating inner wall 56 is shown with four sets of ducts 62, 64 for delivering air to a four-bladed rotor. Butterfly valves 44 can be seen in the position they could take in response to a requirement for a desired helicopter operation. Separators 66 between adjacent butterfly valves define airflow passages for the valves.

Figure 5:
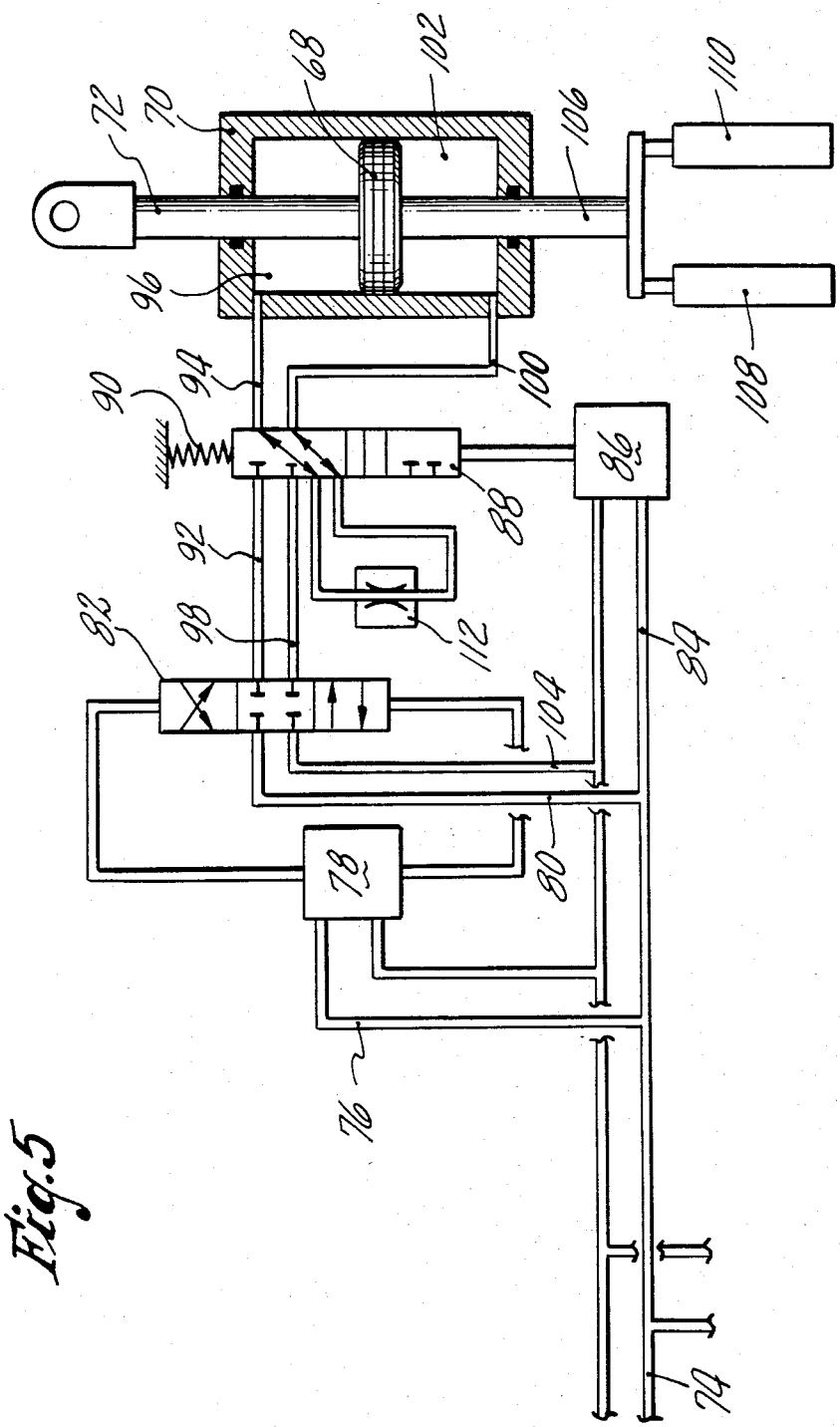
FIG. 5 is a schematic showing of an actuator hydraulic system for one butterfly valve.

The actuators for the butterfly valves are powered hydraulically, although they could be powered electrically or pneumatically. FIG. 5 shows schematically one of the linear hydraulic servo actuators. Each actuator includes piston 68 working in cylinder 70, with piston rod 72 for connection with butterfly valve linkage. Hydraulic pressure is supplied from conduit 74 through line 76 to servo pilot stage 78, through line 80 to three-way valve 82 and through line 84 to bypass pilot stage 86. Bypass pilot stage 86 operates spring loaded two-way valve 88.

During normal operation of the system, hydraulic pressure at bypass pilot stage 86 moves valve 88 against the force of spring 90 to a position connection passage 92 to passage 94 and chamber 96 in cylinder 70 on one side of piston 68 and connecting passage 98 to passage 100 and chamber 102 on the other side of the piston. Actuation of servo pilot stage 78 in response to a control input signal results in movement of three-way valve 82 to connect line 80 to either passage 92 and chamber 96 or passage 98 and chamber 102, depending upon the position of the three-way valve, to establish the position of the associated butterfly valve in accordance with the input signal. At the same time, and also depending upon the position of the valve, passage 92 or passage 98 would be connected to return line 104. Piston 68 also has piston rod 106 which is operatively connected to linear voltage displacement transducers, such as linear transducers 108 and 110 which monitor piston and thus butterfly valve position and provide an electric signal for feedback or other purposes. One of the signals is to a fault monitor in the actuator control system. Alternately, the transducers may provide only a monitor signal and a mechanical linkage provides feedback.

In its spring loaded position due to failure of the actuator, control input signal, fluid supply or soxe other reason, two-way valve 88 connects cylinder chambers 96 and 102 through damping orifice 112. This permits fluid to pass from one side of piston 68 to the other side and a change in the position of the piston and its attached butterfly valve. The averaging linkage, as explained below, connecting all of the butterfly valves, may thus position a butterfly valve when its actuator or controller is disabled and the butterfly valve prevented from taking an extreme position having a serious detrimental effect on blade and aircraft operation.

Figure 6:
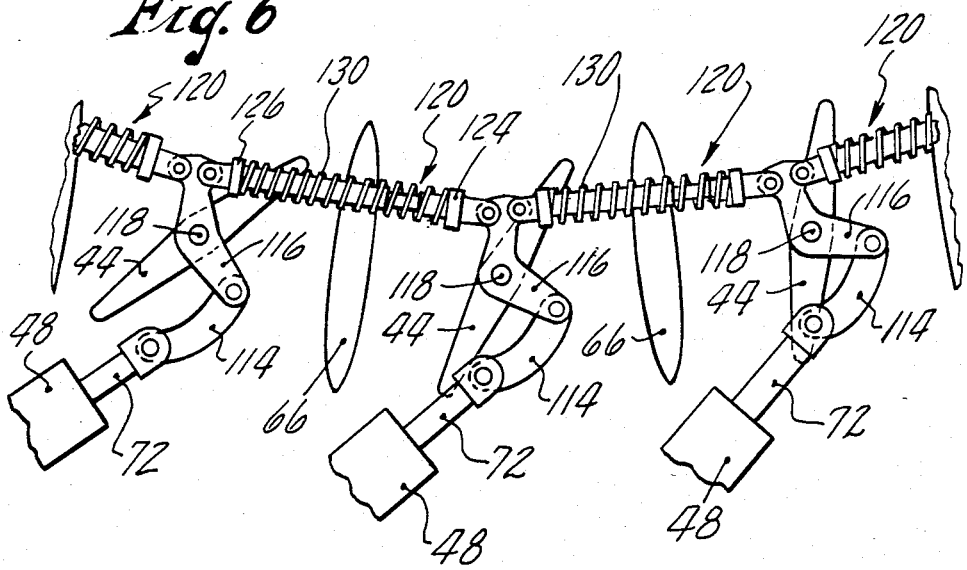
FIG. 6 shows the actuator and butterfly valve averaging linkage.

In FIG. 6 the connection of actuators to butterfly valves is shown as well as the averaging linkage connection between adjacent valves which provides compensation in the event of an actuator or other system problem. Piston rod 72 in actuator 48 is connected by link 114 to one arm of crank 116 which is connected to and rotates butterfly valve 44 about its rotational axis 118. The other end of the crank is connected to averaging linkage 120 interconnecting each butterfly valve 44.

Figure 7:
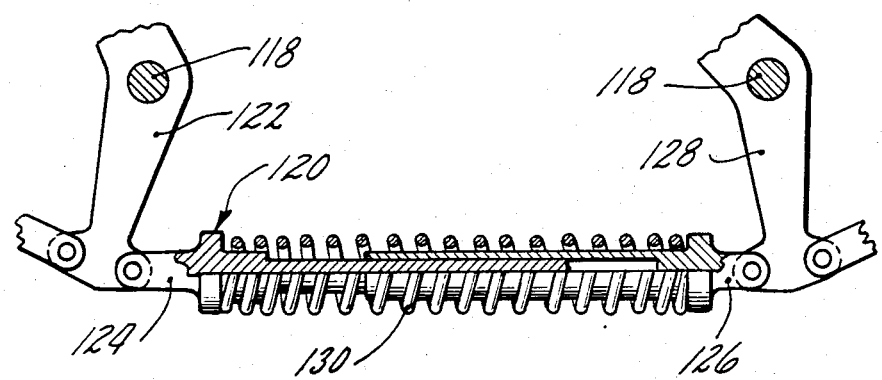
FIG. 7 shows in detail the butterfly valve averaging linkage.

Details of the averaging linkage are shown in FIG. 7. In that figure, butterfly valve crank 122 is pivotally connected to one end of link 124 and the other end of the link is slideably contained within link 126 connected to valve crank 128 for the adjacent butterfly valve. Spring 130 surrounds links 124 and 126 and is loaded in compression at all times, providing for continued operation in the event of spring fracture. There is an averaging linkage between each pair of adjacent butterfly valves so that the linkage forms a ring around a circumference of the plenum chamber.

Under normal operation of the circulation control system, butterfly valves 44 and 46 are opened the required amount according to their azimuth location around the plenum chamber by means of control signals to each actuator 48 and 52 derived from pilot commands by way of digital and/or analog processing. Springs 130 in averaging linkage 120 extend or compress in accordance with the position differences between adjacent butterfly valves. If a fault should develop in any actuator or within its control or power system as detected by the fault monitor through comparison of a signal from transducer 108 or 110 with the actuator control input signal, the actuator is shut down. When this happens, bypass pilot stage 86 assumes a position which places two-way valve 88 in a bypass mode with spring 90 positioning two-way valve 88 to connect chambers 96 and 102 on opposite sides of piston 68 through damping orifice 112. The actuator's butterfly valve is free to assume an average position by steady state forces from the averaging linkage springs on either side of the butterfly valve. Fluctuating forces on the butterfly valve may tend to drive it away from the average position. However, damping forces from the fluid flowing between chambers 96 and 102 through orifice 112 will minimize this effect and smooth the variation of butterfly valve position.

It is to be noted that either circumferential wall of the plenum chamber could be the rotating wall, depending upon the rotor system construction. Ih the showing of FIG. 7, the actuator, butterfly valve and averaging linkage assembly is for a construction in which the outer plenum chamber wall is the rotating wall. In the showing of FIG. 3, 4 and 6, the butterfly valve and averaging linkage assembly is for a construction in which the inner plenum chamber wall is the rotating wall.

Figure 8:
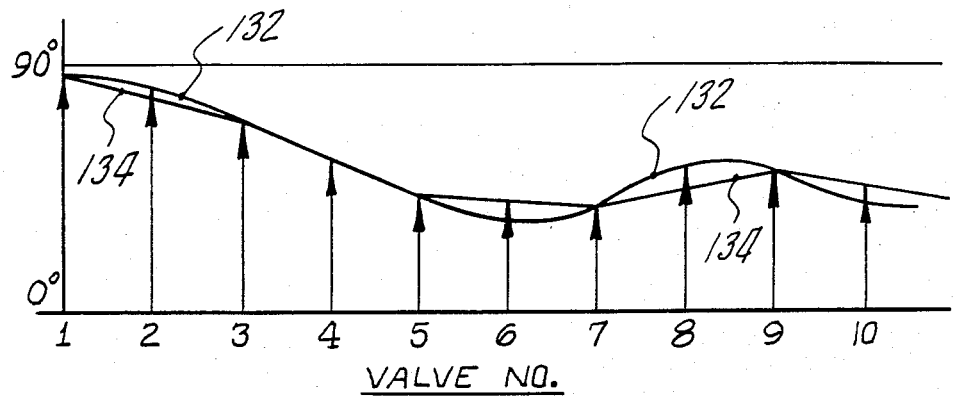
FIG. 8 is a plot of butterfly valve position for normal and distressed operation.

FIG. 8 is a plot of butterfly operation for a number of adjacent valves and shows the effect of the averaging linkage upon an assumed inoperativeness of every other valve. Line 132 shows a representative variation of valve position for a particular desired aircraft performance. Line 134 shows what that curve would be in the event of disablement of the actuators for every other valve, valves 2, 4, 6, 8 and 10, as a result of the averaging linkage-actuator bypass mode operation. Aircraft performance will not suffer unduly as the result of an inoperative state of one or more actuators. It is estimated that about two-thirds of the actuators could be disabled and the remaining one-third would provide effective aircraft control.

In the event of the loss of one butterfly valve actuator in a construction without the averaging linkage, the valve could go to a hardover position, possibly closed. The remaining valves would have to open more to compensate for the inoperative valve. The resulting discontinuities in flow could cause excessive aircraft vibration. If several actuators in such a system should be lost in the same plenum chamber area, the remaining actuators could be saturated (reach limit of available range) and aircraft control seriously impaired. With the averaging linkage, the result of actuator loss, even several in the same area, is only to lose the high harmonic content of airflow modulation, and effective control of the aircraft is retained. The invention uses the large quantity of separate actuators that are required for relatively precise flow modulation to provide redundancy without increasing system complexity.

It should be understood that the invention is not limited to the particular embodiment shown and described herein but that various changes and modifications may be made without departing from the spirit or scope of this concept as defined by the following claims.

We claim:

1. A circulation control rotor system for an aircraft having rotor blades and ducts in said blades for receiving compressed air for collective and cyclic pitch control, a compressed air system including an annular plenum chamber for receiving compressed air, valves for controlling the flow of compressed air from said plenum chamber to said blade ducts, actuator means for positioning each valve and means connecting each actuator to a single valve characterized by means interconnecting said connecting means, and means for said interconnecting means to position any valve having disabled actuator means.

2. A circulation control rotor system in accordance with claim 1 in which the blades have leading edge and trailing edge ducts and the valves for controlling the flow of compressed air include separate valves for the leading edge ducts and the trailing edge ducts.

3. A circulation control rotor system in accordance with claim 2 in which said interconnecting means separately connects actuator connecting means for said leading edge duct valves and actuator connecting means for said trailing edge duct valves.

4. A circulation control rotor system in accordance with claim 1 in which said interconnecting means includes spring means.

5. A circulation control rotor system in accordance with claim 4 in which said spring means are loaded in compression.

6. In a circulation control rotor system for an aircraft, an annular plenum chamber for receiving compressed air, a plurality of valves around a circumference of said plenum chamber for controlling the discharge of air from said plehum chamber, an actuator connected to each valve to operate the valve, linkage interconnecting said valves and combining their actions, each actuator including means for positioning its associated valve, means for operating said positioning means in response to aircraft pilot signals, means for the positioning of said valve independently of said operating means, means associated with said positioning means to provide a signal of actual valve position including a feedback signal, and a valve position monitor signal, means for operating said independently valve positioning means only in response to a position fault signal, and said valve interconnecting linkage including springs for operating said independently valve positioning means.

7. A circulation control rotor system in accordance with claim 6 in which the linkage interconnecting the valves is in the form of a ring around a circumference of the plenum chamber.

8. In a circulation control rotor system for an aircraft, an annular plenum chamber for receiving compressed air, a plurality of valves around a circumference of said plenum chamber for controlling the discharge of air from said plenum chamber, an actuator connected to each valve to operate the valve, linkage interconnecting said valves including springs loaded in compression between adjacent valves, each actuator being of the hydraulic type and including piston means working in a cylinder and having a connection with an associated valve, servo means receiving a control input from the aircraft pilot for operating said piston to establish valve position in accordance with said control input, bypass valve means controlling fluid flow to said piston, fluid flow restricting means adapted to be connected to opposite sides of said piston by said bypass valve means, and means operatively connected to said piston for providing a feedback signal to said control input and a monitor signal of vane position, said bypass valve means having a first position providing actuator operation of said valve in response to said control input and a second position permitting fluid flow from opposite sides of said piston through said fluid flow restriction and disconnecting said actuator when said monitor signal indicates a vane position different than said control input, said springs adjacent said valve positioning said valve when said bypass valve is in said second position.

9. A circulation control rotor system in accordance with claim 8 in which the signal providing means operatively connected to the piston are linear transducers.

10. A circulation control rotor system in accordance with claim 8 in which the valve interconnecting linkage includes a first member connected to one valve and having a portion axially sliding within a portion of second member connected to an adjacent valve and the spring surrounds portions of the two members.

* * * * *